US00RE46281E

(19) United States
(12) Reissued Patent
Walter et al.

(10) Patent Number: US RE46,281 E
(45) Date of Reissued Patent: Jan. 24, 2017

(54) SET OF CART BASKETS

(71) Applicant: AMSA, Inc., Boulder, CO (US)

(72) Inventors: Ivor Michel Walter, Boulder, CO (US); Jeroen Engel, Bromhof (ZA); Wilson Zeng, Foshan (CN)

(73) Assignee: AMSA, Inc., Boulder, CO (US)

(21) Appl. No.: 29/543,729

(22) Filed: Oct. 27, 2015

Related U.S. Patent Documents

Reissue of:
(64) Patent No.: Des. 656,700
Issued: Mar. 27, 2012
Appl. No.: 29/388,157
Filed: Mar. 24, 2011

U.S. Applications:
(62) Division of application No. 29/486,266, filed on Mar. 27, 2014, now Pat. No. Re. 45,961, which is an application for the reissue of Pat. No. Des. 656,700.

(51) LOC (10) Cl. ..... 12-02
(52) U.S. Cl.
USPC ..... D34/27
(58) Field of Classification Search
USPC ..... D34/12–27
(Continued)

(56) References Cited

U.S. PATENT DOCUMENTS 3,039,564 A 6/1962 Shaukis
D247,953 S 5/1978 Rehrig
(Continued)

OTHER PUBLICATIONS

Unarco PC-41 U Scan of website [http://unarco.com/PC41 U.pdf] showing prior art cart manufactured by Unarco.
(Continued)

*Primary Examiner* — Phillip S Hyder
(74) *Attorney, Agent, or Firm* — Polson Intellectual Property Law, PC; Margaret Polson

(57) CLAIM

The ornamental design for a set of cart baskets, as shown and described.

DESCRIPTION

FIG. 1 is a front perspective view of the first embodiment for a set of cart baskets showing my new design;
FIG. 2 is a side elevation view of the right and left sides, which are mirror images, of FIG. 1.
FIG. 3 is a front side elevation view of FIG. 1.
FIG. 4 is back side elevation view of FIG. 1.
FIG. 5 is a top plan view of FIG. 1.
FIG. 6 is a bottom plan view of FIG. 1.
FIG. 7 is a front perspective view of the second embodiment for a set of cart baskets showing my new design;
FIG. 8 is a side elevation view of the right and left sides, which are mirror images, of FIG. 7.
FIG. 9 is a front side elevation view of FIG. 7.
FIG. 10 is back side elevation view of FIG. 7.
FIG. 11 is a top plan view of FIG. 7.
FIG. 12 is a bottom plan view of FIG. 7.
FIG. 13 is a front perspective view of the third embodiment for a set of cart baskets showing my new design;
FIG. 14 is a side elevation view of the right and left sides, which are mirror images, of FIG. 13.
FIG. 15 is a front side elevation view of FIG. 13.
FIG. 16 is back side elevation view of FIG. 13.
FIG. 17 is a top plan view of FIG. 13; and,
FIG. 18 is a bottom plan view of FIG. 13.
The broken line showing of the frame, logo panel, *bottom of the baskets,* and back gates is included for the purpose of illustrating elements of the cart and forms no part of the claimed design.

1 Claim, 18 Drawing Sheets

Matter enclosed in heavy brackets [ ] appears in the original patent but forms no part of this reissue; matter printed in italics indicates the additions made by reissue.

(AMENDED)

(58) Field of Classification Search
CPC .. B62B 2501/065; B62B 3/1444; B62B 3/144; B62B 3/1468; B62B 3/1496
See application file for complete search history.

(56) References Cited

U.S. PATENT DOCUMENTS

| | | | | | |
|---|---|---|---|---|---|
| 4,632,411 | A | | 12/1986 | Badger | |
| 4,650,199 | A | | 3/1987 | Rehrig | |
| D294,419 | S | | 2/1988 | Rehrig | |
| D296,259 | S | | 6/1988 | Rehrig | |
| D317,219 | S | | 5/1991 | Rehrig | |
| D346,473 | S | | 4/1994 | Hubble | |
| D400,679 | S | | 11/1998 | Kern et al. | |
| 5,865,448 | A | | 2/1999 | Kern et al. | |
| D412,046 | S | | 7/1999 | Rehrig et al. | |
| 5,947,313 | A | | 9/1999 | Kern et al. | |
| D426,365 | S | | 6/2000 | Rehrig et al. | |
| 6,126,181 | A | | 10/2000 | Ondrasik | |
| 6,533,297 | B2 | | 3/2003 | Saccani | |
| 6,644,674 | B2 | | 11/2003 | Simard | |
| 6,676,139 | B1 | | 1/2004 | Saccani | |
| 6,932,363 | B2 | | 8/2005 | D'Angelo | |
| 6,981,708 | B1 | | 1/2006 | Tucker et al. | |
| D528,732 | S | | 9/2006 | Hubbard et al. | |
| D538,501 | S | | 3/2007 | Walter | |
| D550,423 | S | * | 9/2007 | Splain et al. | D34/12 |
| D556,413 | S | * | 11/2007 | Splain et al. | D34/12 |
| D564,172 | S | * | 3/2008 | Steinhobel | D34/12 |
| D580,619 | S | | 11/2008 | Walter | |
| D583,523 | S | | 12/2008 | Deal et al. | |
| D607,173 | S | | 12/2009 | Selvig et al. | |
| D628,759 | S | | 12/2010 | Walter | |
| D633,269 | S | | 2/2011 | Walter | |
| D638,602 | S | | 5/2011 | Walter | |
| D644,809 | S | | 9/2011 | Walter | |
| D645,222 | S | | 9/2011 | Walter | |
| D651,655 | S | | 1/2012 | Walter | |
| D656,288 | S | | 3/2012 | Walter | |
| D656,700 | S | | 3/2012 | Walter | |
| 2001/0022436 | A1 | | 9/2001 | Simard | |
| 2003/0151219 | A1 | | 8/2003 | Simard | |
| 2010/0276899 | A1 | * | 11/2010 | Burdwood | B62B 3/1404 280/33.991 |

OTHER PUBLICATIONS

Wanzl Tango Scan of website [http://wanzl.com/OOO/En/Home/Products/Self-Service_systems/Shopping_Trolleys/Shopping_Trolley_Series/Tango.html] showing prior art cart manufactured by Wanzl.

First Amended Complaint and Jury Demand filed by *AMSA, Inc. dba Versacart, Inc.* v. *The Peggs Company, Inc.,* US District Court, District of Colorado, filed Apr. 18, 2014, for infringement of parent patent D656,700 and others. 46 pages.

Answer, Affirmative Defenses and Counterclaims to First Amended Complaint and Jury Demand filed by *AMSA, Inc. dba Versacart, Inc.* v. *The Peggs Company, Inc.,* US District Court, District of Colorado, filed May 9, 2014. 18 pages.

Plaintiff's Answer to Defendant's nswer, Affirmative Defenses and Counterclaims to First Amended Complaint and Jury Demand filed by *AMSA, Inc. dba Versacart, Inc.* v. *The Peggs Company, Inc.,* US District Court, District of Colorado, filed May 21, 2014.9 pages.

Applicant AMSA, Inc. DBA VersaCart Systems Brochure for Orgill Spring Dealer Market 2015. 6 pages.

Applicant AMSA, Inc. DBA VersaCart Systems Brochure for Orgill Fall Dealer Market 2015. 6 pages.

Applicant AMSA, Inc. DBA VersaCart Systems Brochure for Orgill Fall Market 2012. 4 pages.

Applicant AMSA, Inc. DBA VersaCart Systems Brochure for Orgill Spring Dealer Market 2014. 6 pages.

Applicant AMSA, Inc. DBA VersaCart Systems Brochure for Orgill Fall Dealer Market 2014. 6 pages.

Applicant AMSA, Inc. DBA VersaCart Systems Retail & Distribution Catalog 2008. 50 pages.

Applicant AMSA, Inc. DBA VersaCart Systems Brochure for ACE Spring Convention 2013. 4 pages.

Applicant AMSA, Inc. DBA VersaCart Systems Brochure for ACE Spring Convention 2014. 4 pages.

Applicant AMSA, Inc. DBA VersaCart Systems Brochure for ACE Spring Convention 2015. 4 pages.

Applicant AMSA, Inc. DBA VersaCart Systems Brochure for ACE Spring Convention 2016. 4 pages.

Applicant AMSA, Inc. DBA VersaCart Systems Brochure for ACE Spring Market 2012. 2 pages.

Peggs KNM075GT Scan of website [http://www.thepeggscompany.com/shopping_carts/large_view/2_tier.html] showing prior art cart manufactured by Peggs.

Plasti-Cart Max 200 Scan of website [http://www.plasti-cart.com/upload/assets/AllPlasticMax200.pdf] showing prior art cart manufactured by Plasti-Cart.

Supercart neXus Scan of website [http://supercart.com/data/products/627854469nexus.pdf] showing prior art cart manufactured by Supercart.

Supercart XL 200 Scan of website [http://supercart.com/data/products/1388572286xlcarrie(xl200).pdf] showing prior art cart manufactured by Supercart.

Technibilt 5141-D Scan of website [http://www.technibilt.com/carts/detail.php?id=36] showing prior art cart manufactured by Technibilt.

Technibilt 5341 Scan of website [http://www.technibilt.com/carts/detail.php?id=30] showing prior art cart manufactured by Technibilt.

Technibilt 5640 Scan of website [http://www.technibilt.com/carts/detail.php?id=28] showing prior art cart manufactured by Technibilt.

U.S. Appl. No. 29/334,767, filed Apr. 1, 2009; Inventor: Ivor Michel Walter.

U.S. Appl. No. 29/380,209, filed Dec. 1, 2010; Inventor: Ivor Michel Walter.

U.S. Appl. No. 29/380,622, filed Dec. 8, 2010; Inventor: Ivor Michel Walter.

U.S. Appl. No. 29/388,081, filed Mar. 23, 2011; Inventor: Ivor Michel Walter.

* cited by examiner

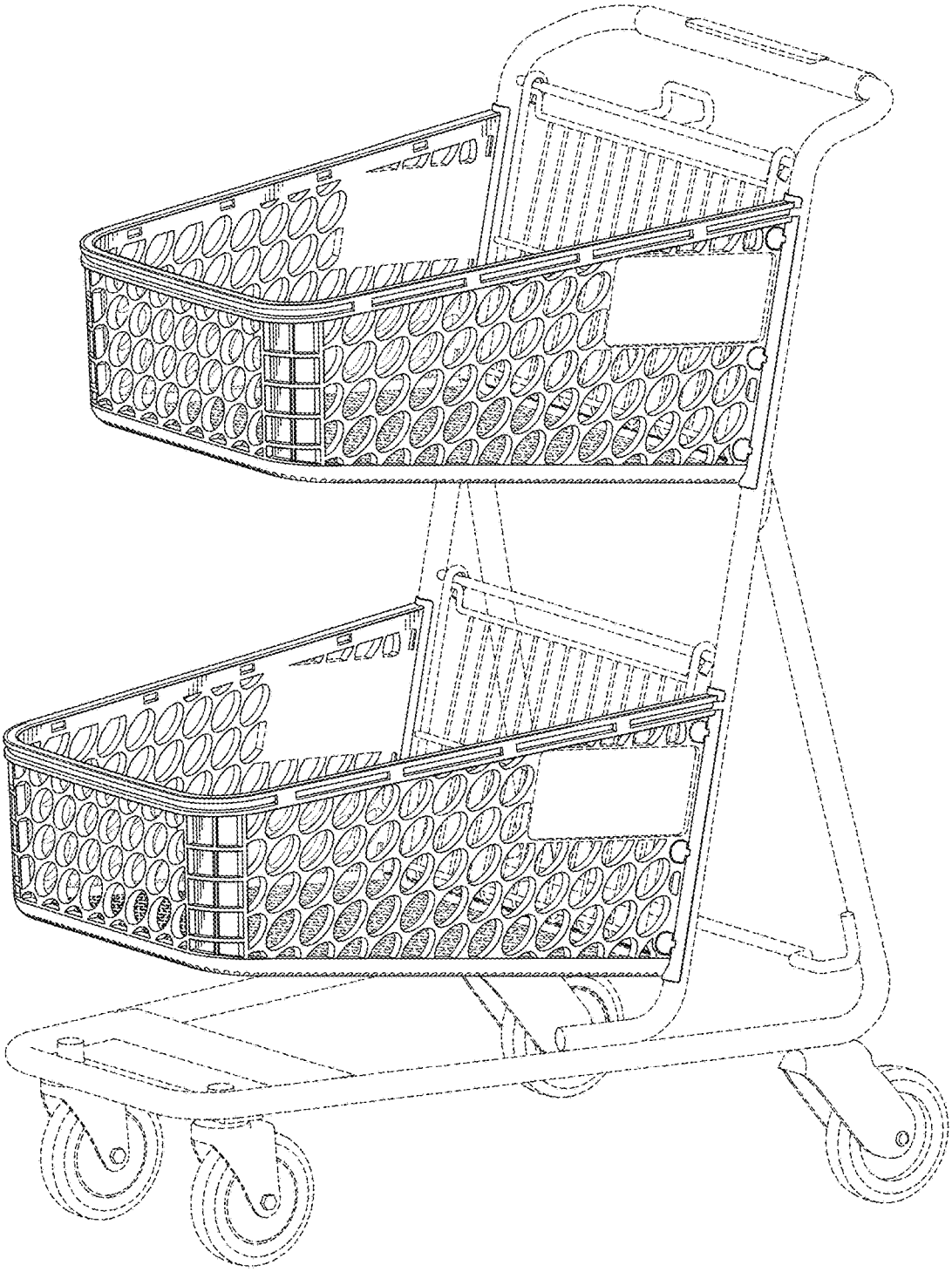
FIG.1 (AMENDED)

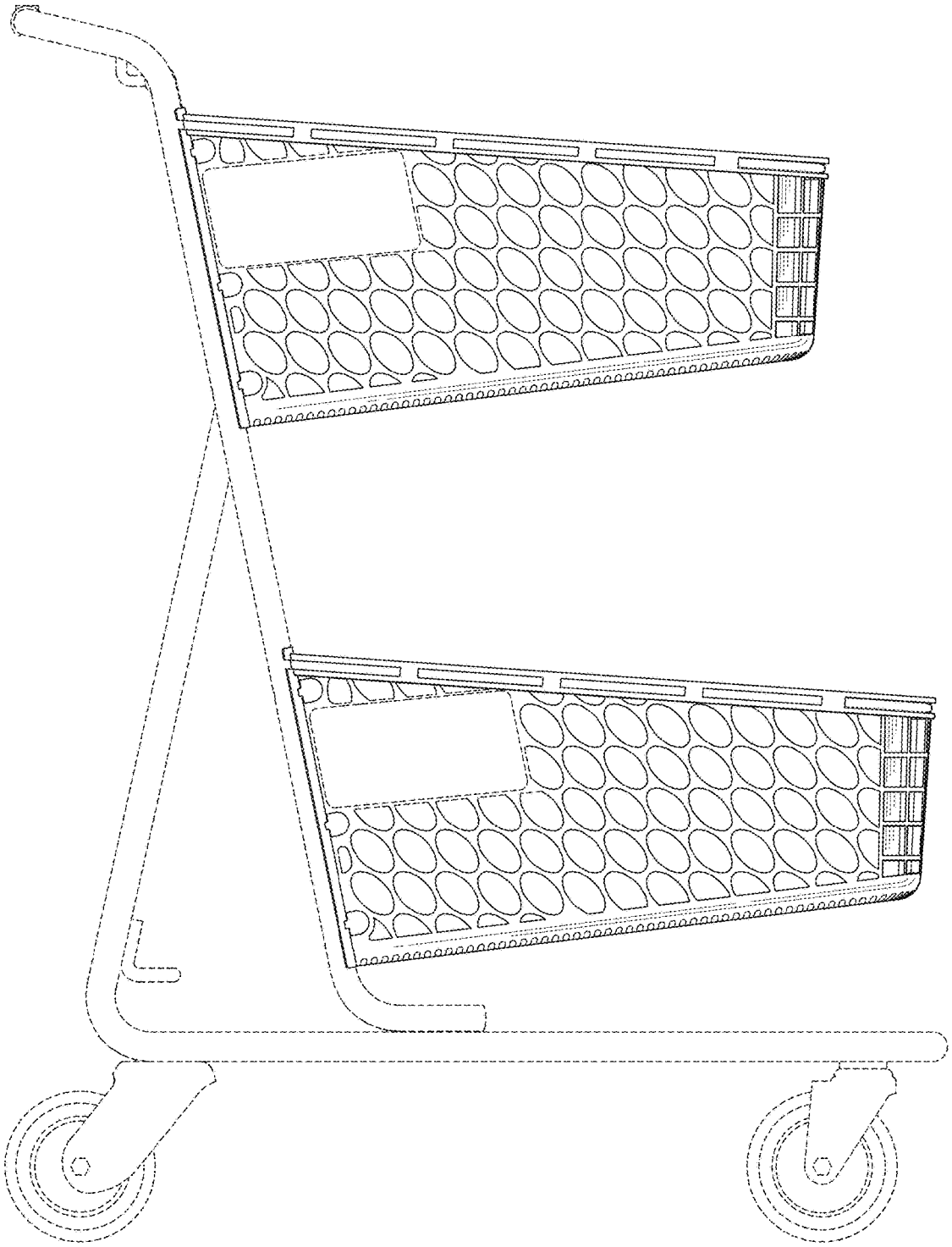
FIG.2 (AMENDED)

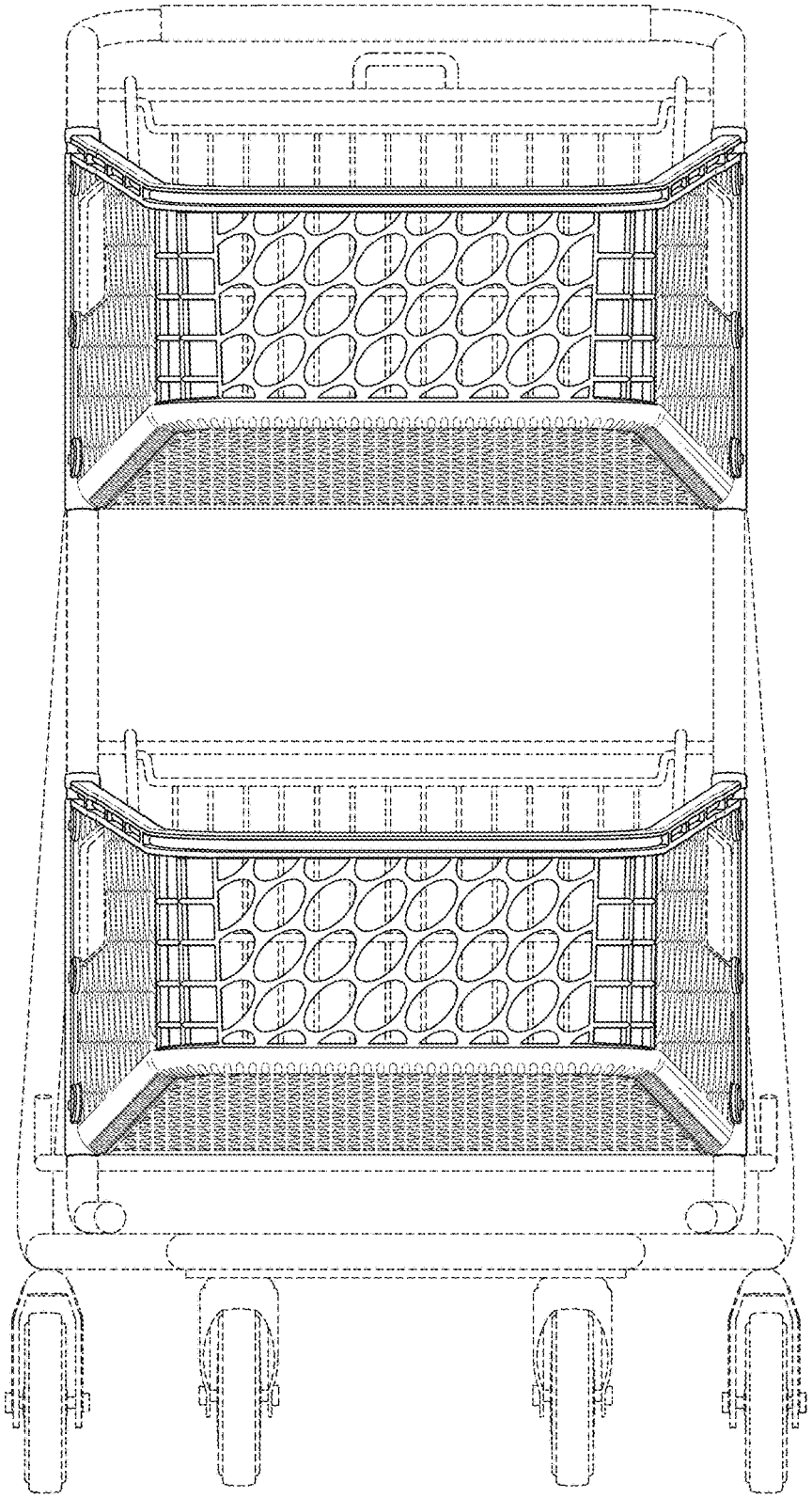
FIG.3 (AMENDED)

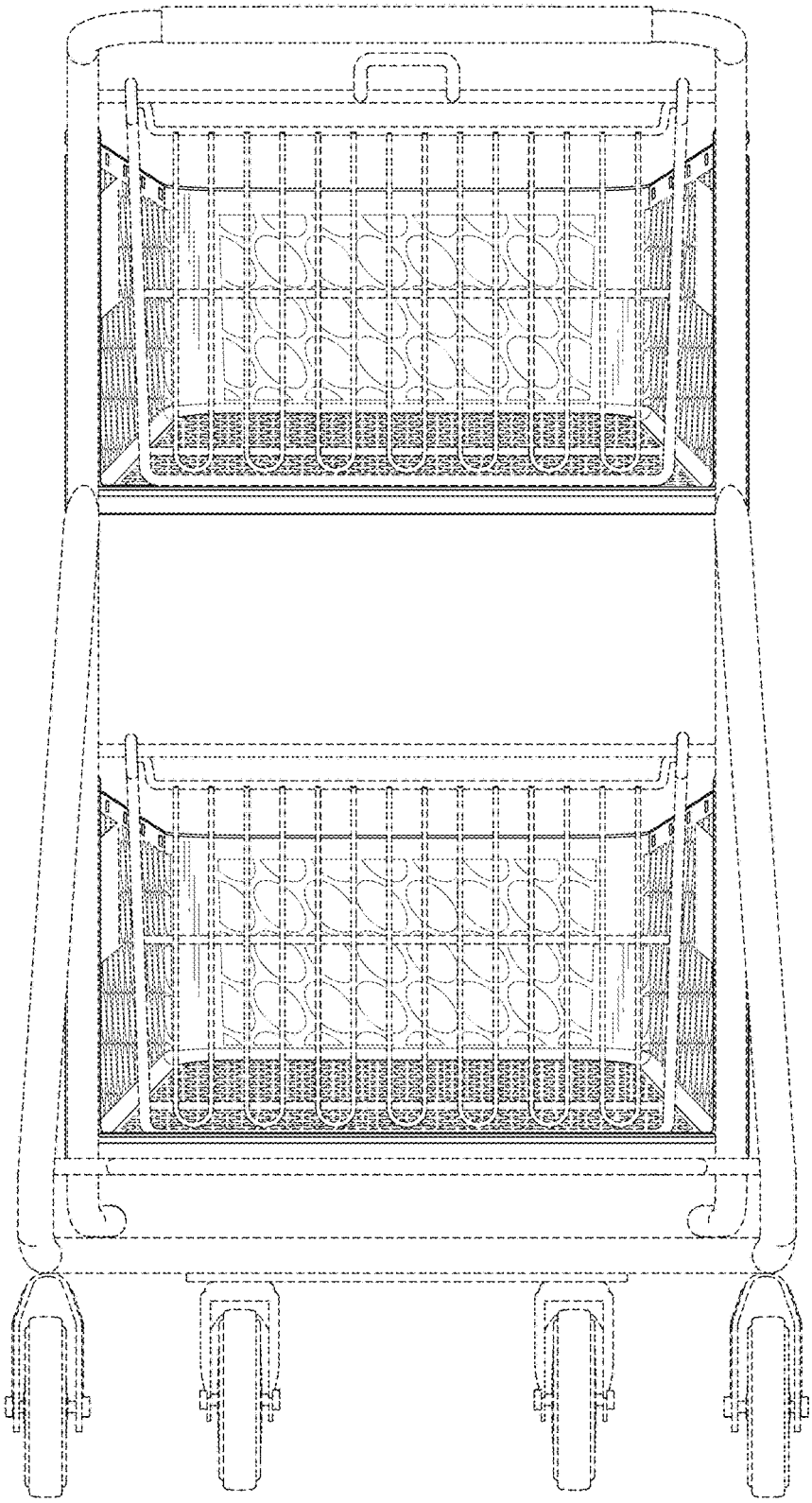
FIG.4 (AMENDED)

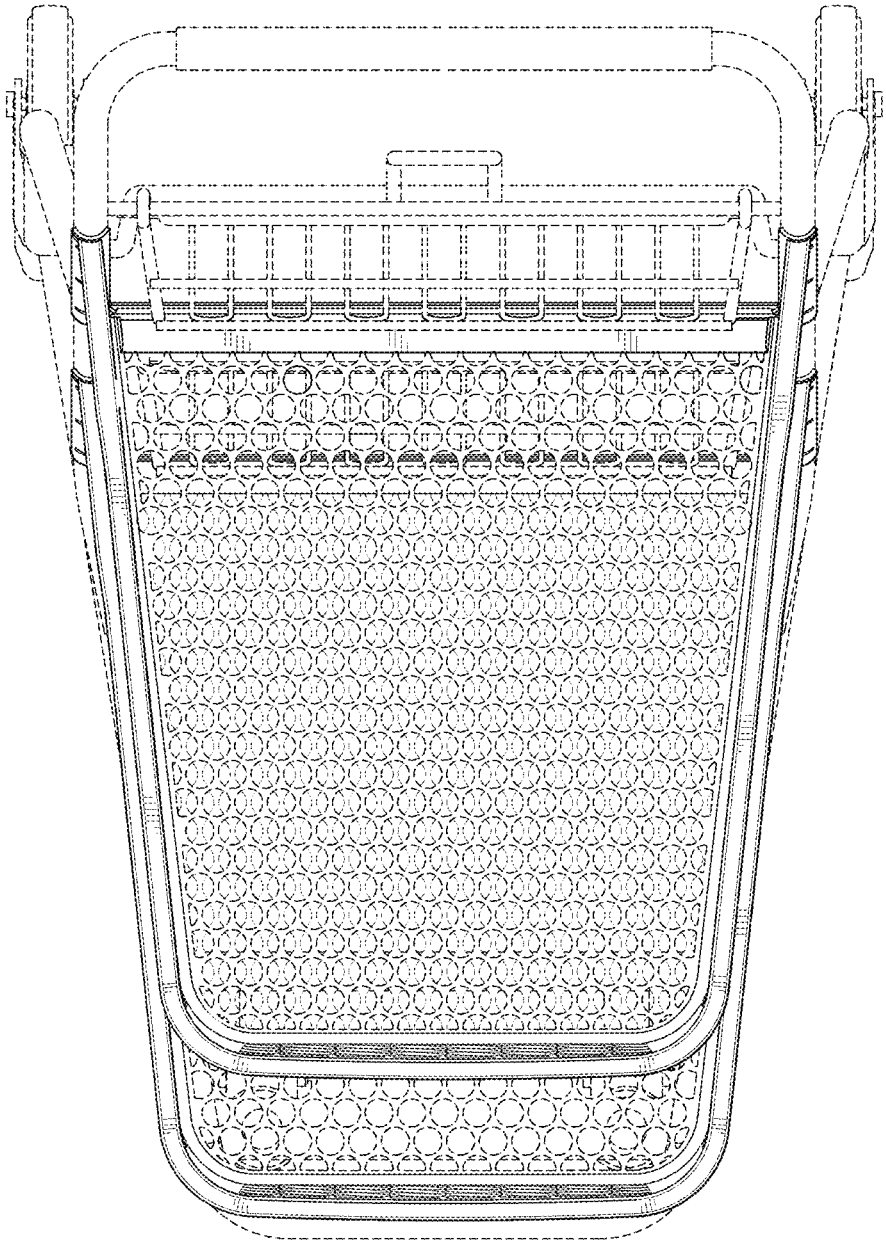
FIG.5 (AMENDED)

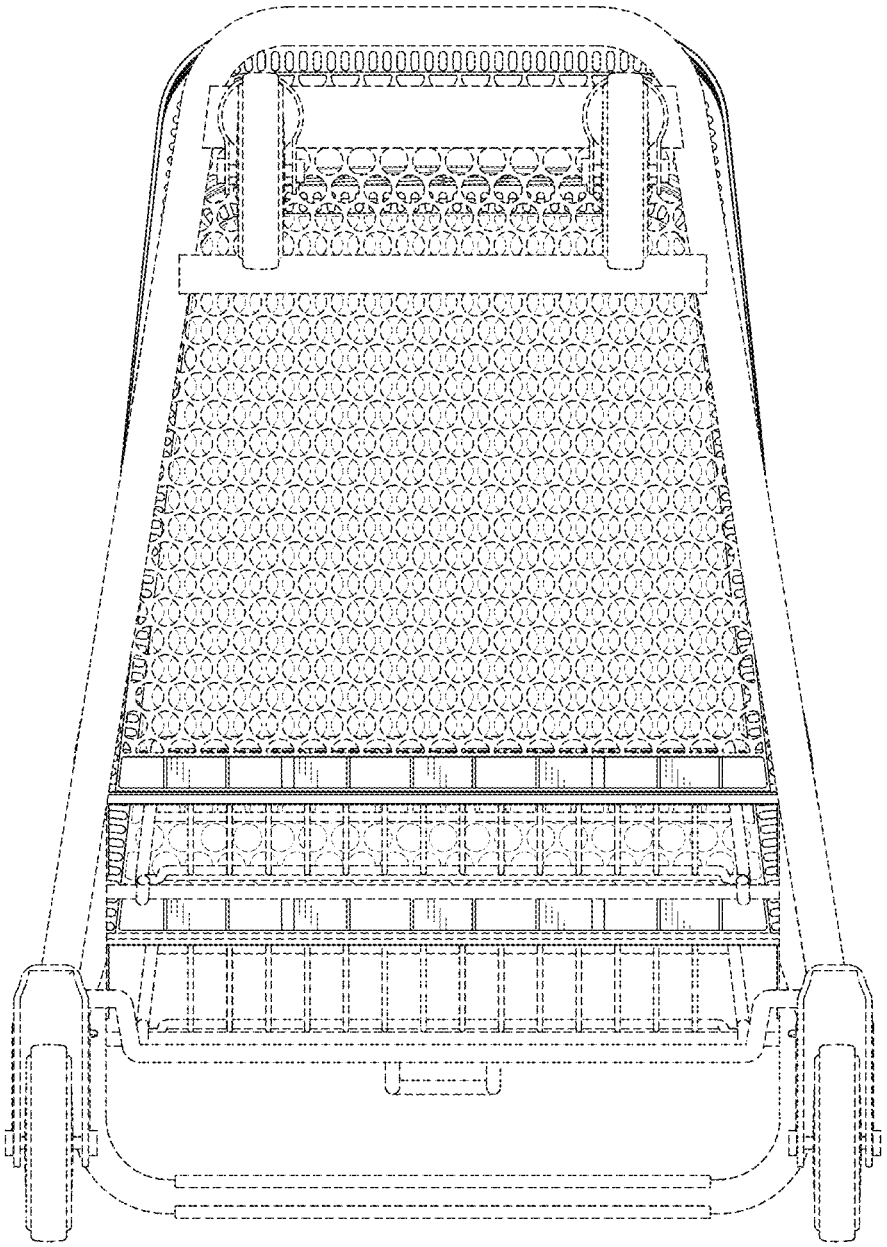
FIG.6 (AMENDED)

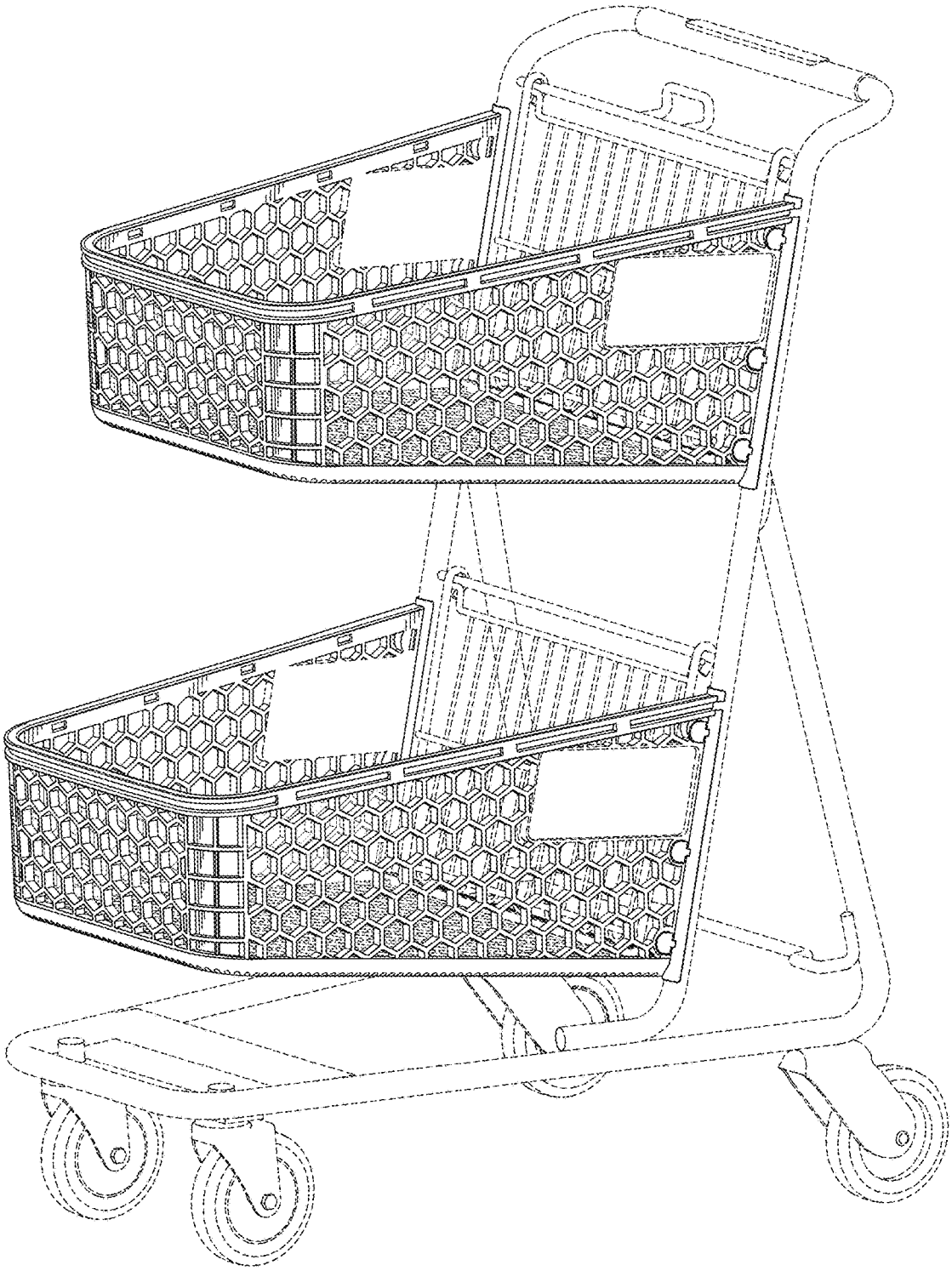
FIG.7 (AMENDED)

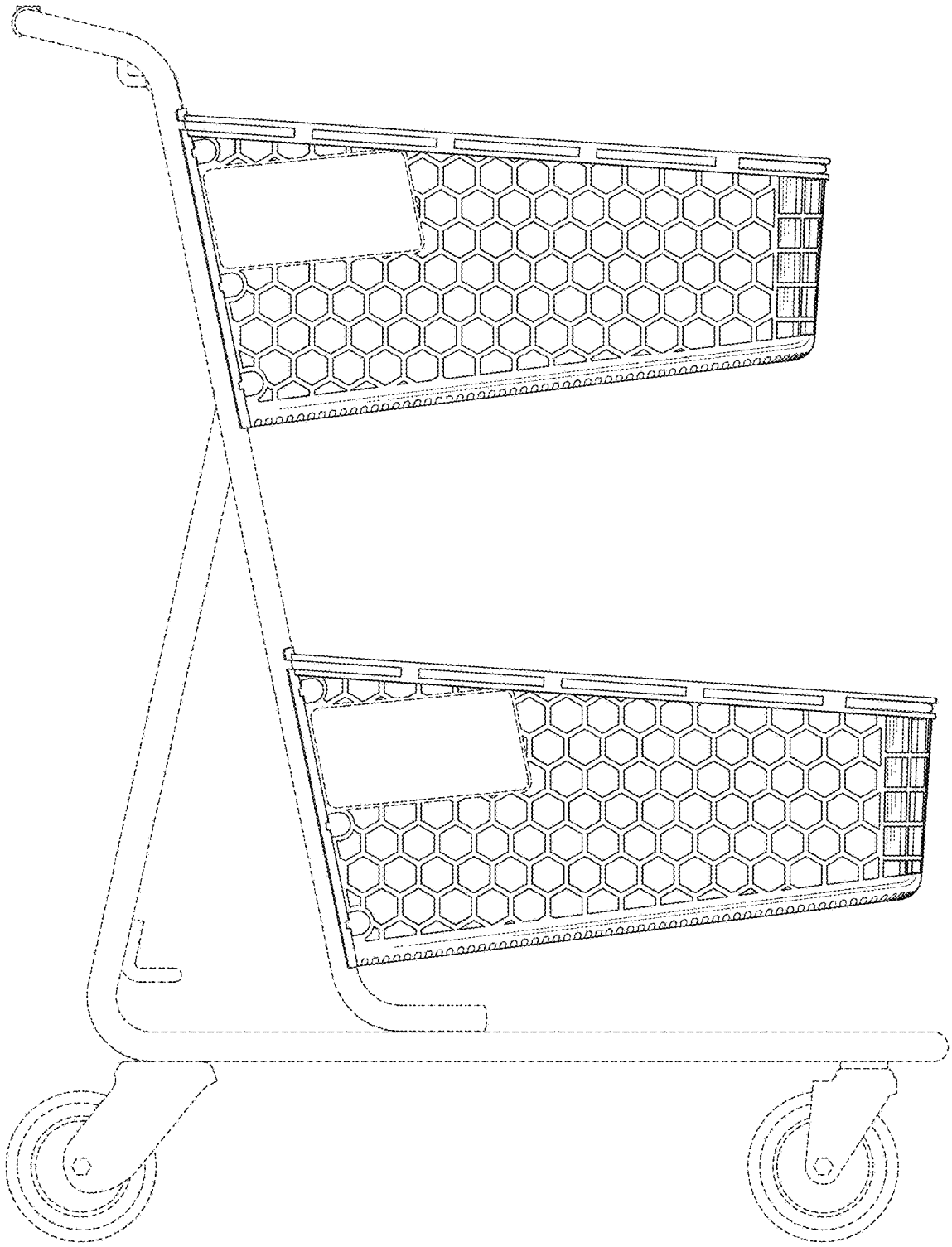
FIG.8 (AMENDED)

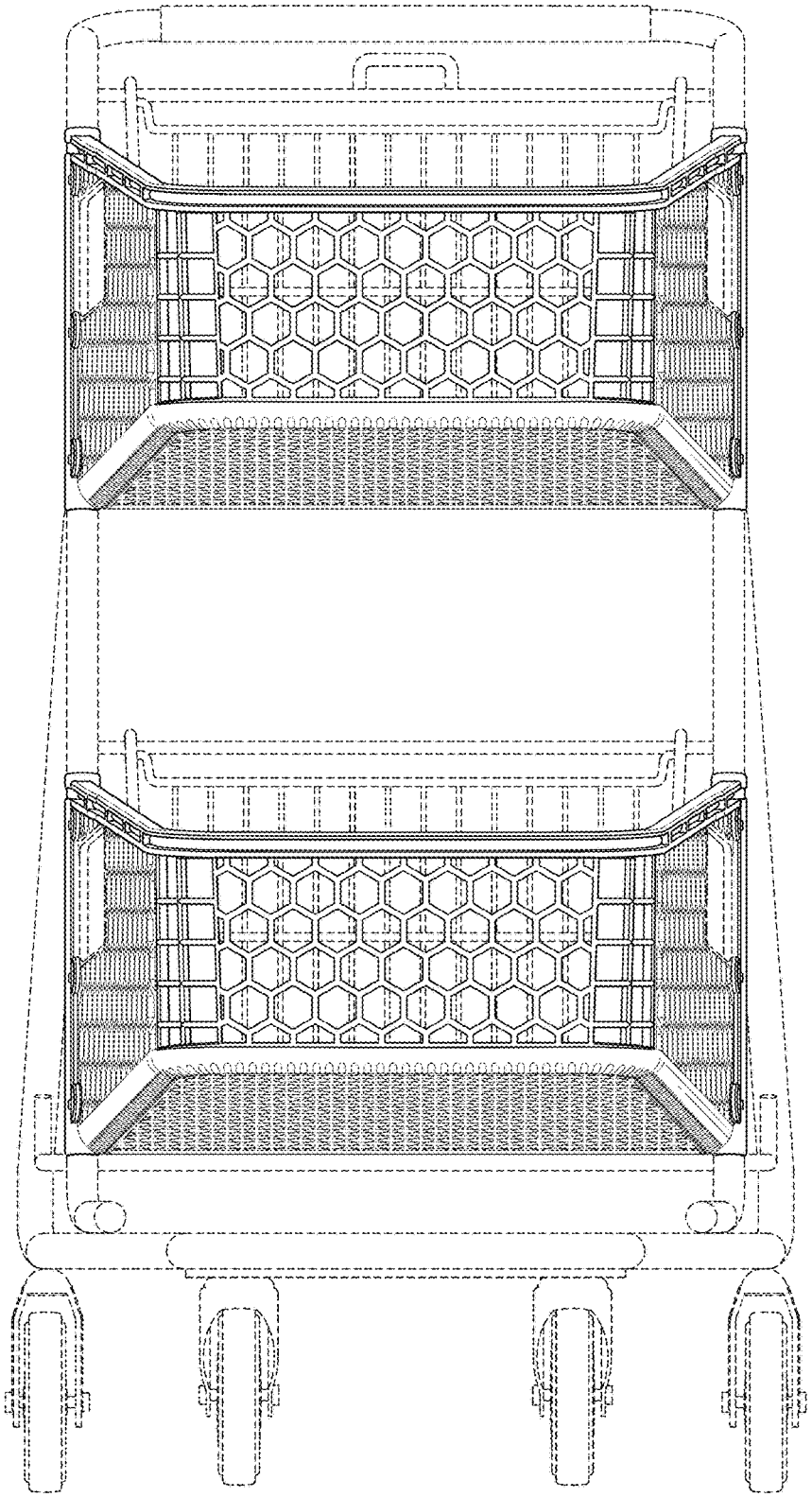
FIG.9 (AMENDED)

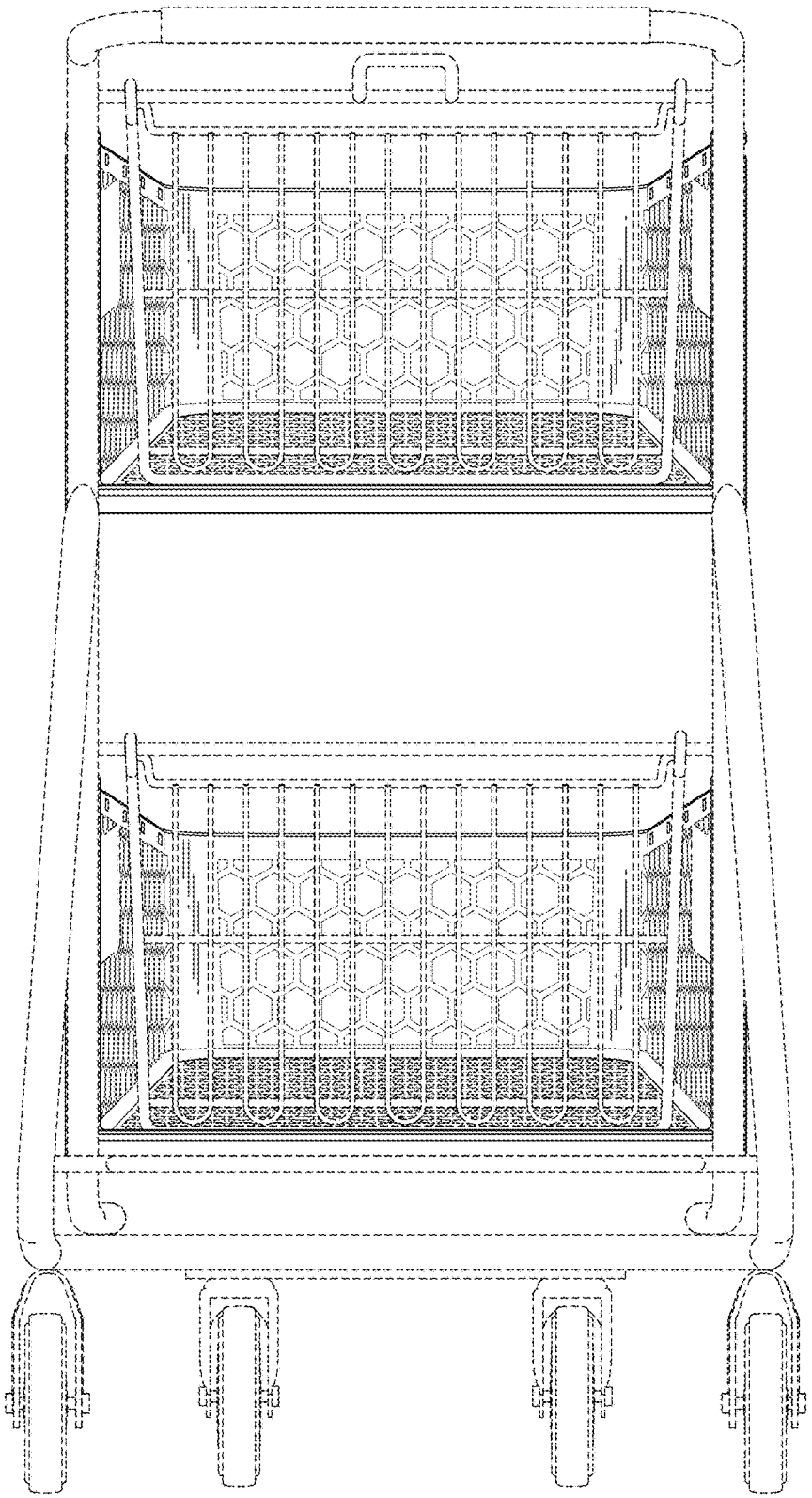
FIG.10 (AMENDED)

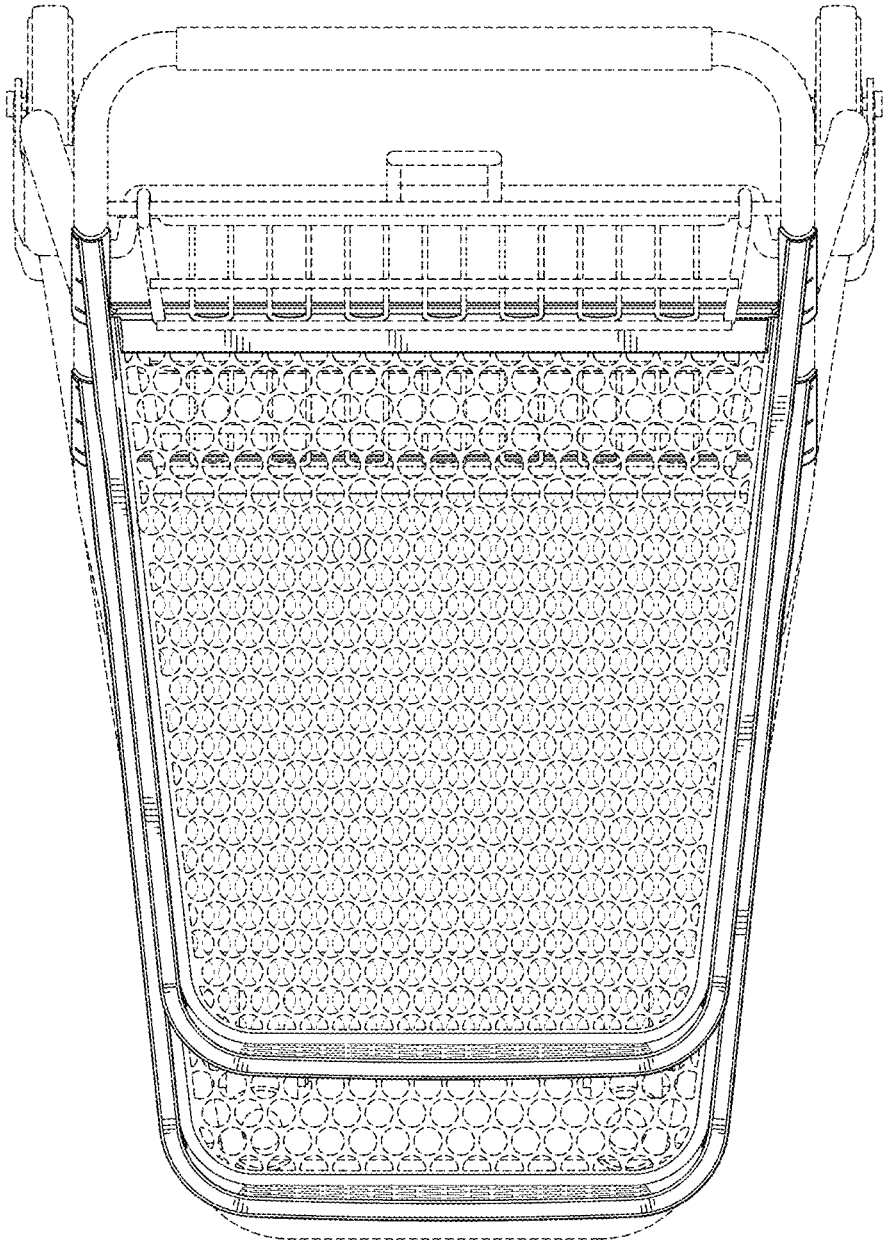
FIG.11 (AMENDED)

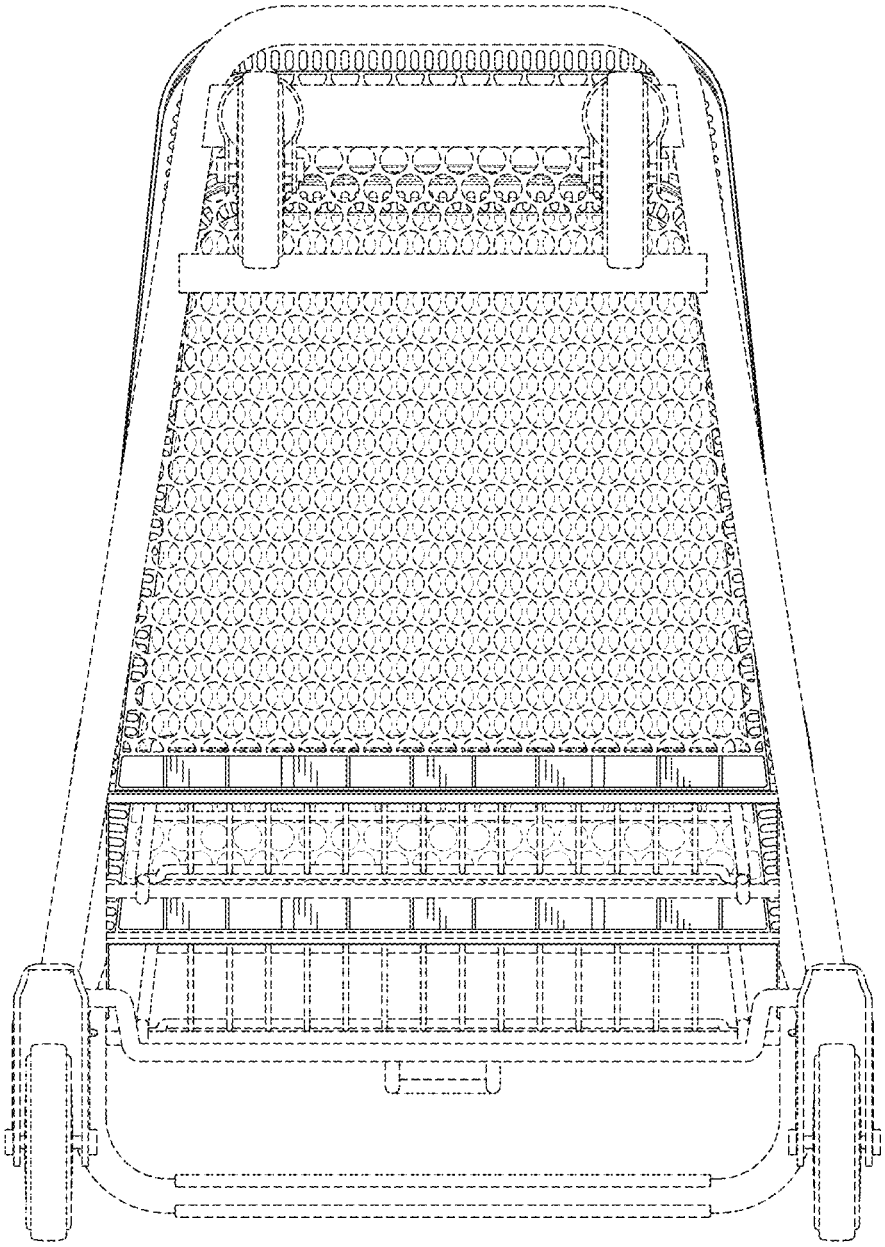
FIG.12 (AMENDED)

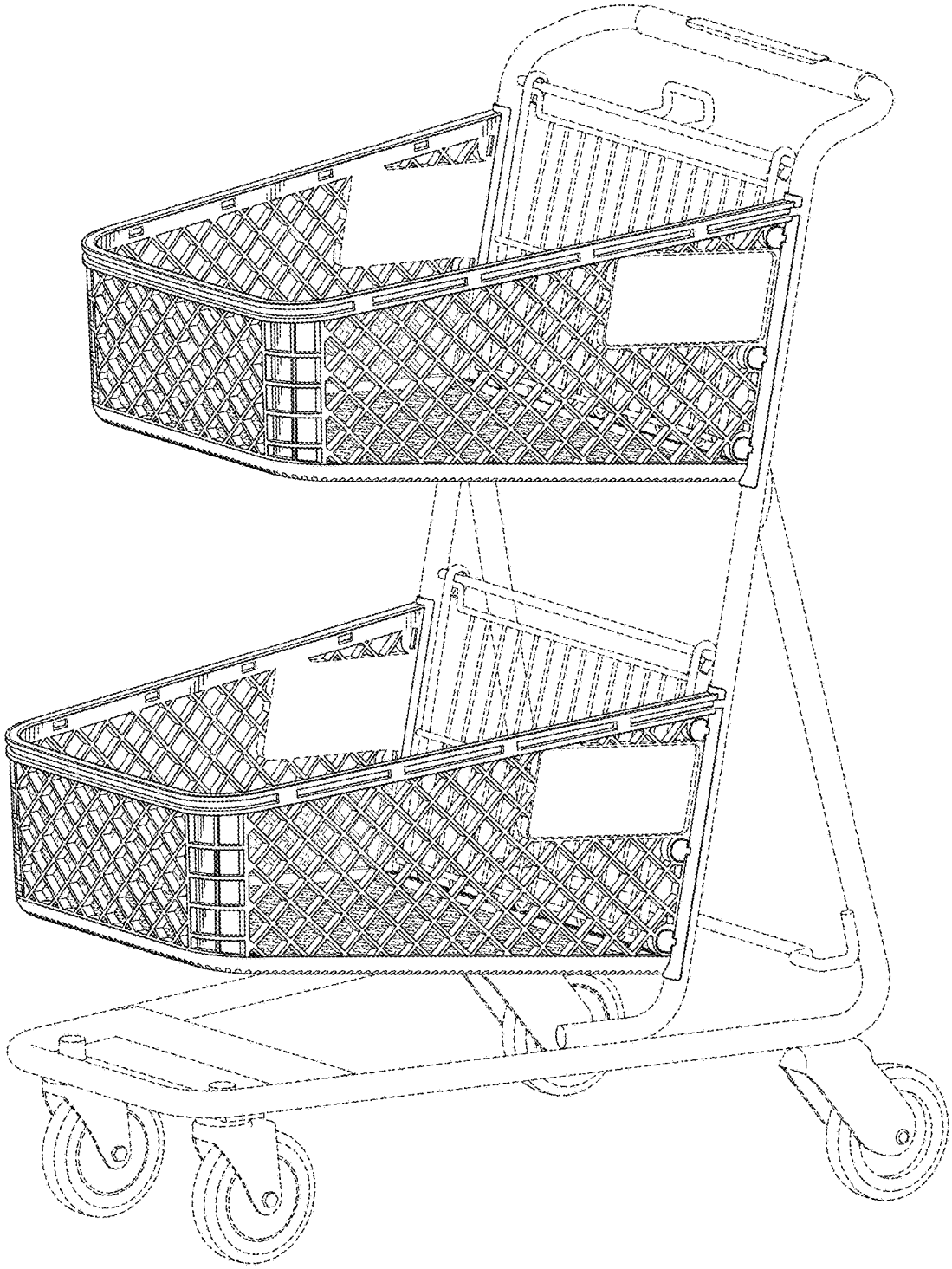
FIG.13 (AMENDED)

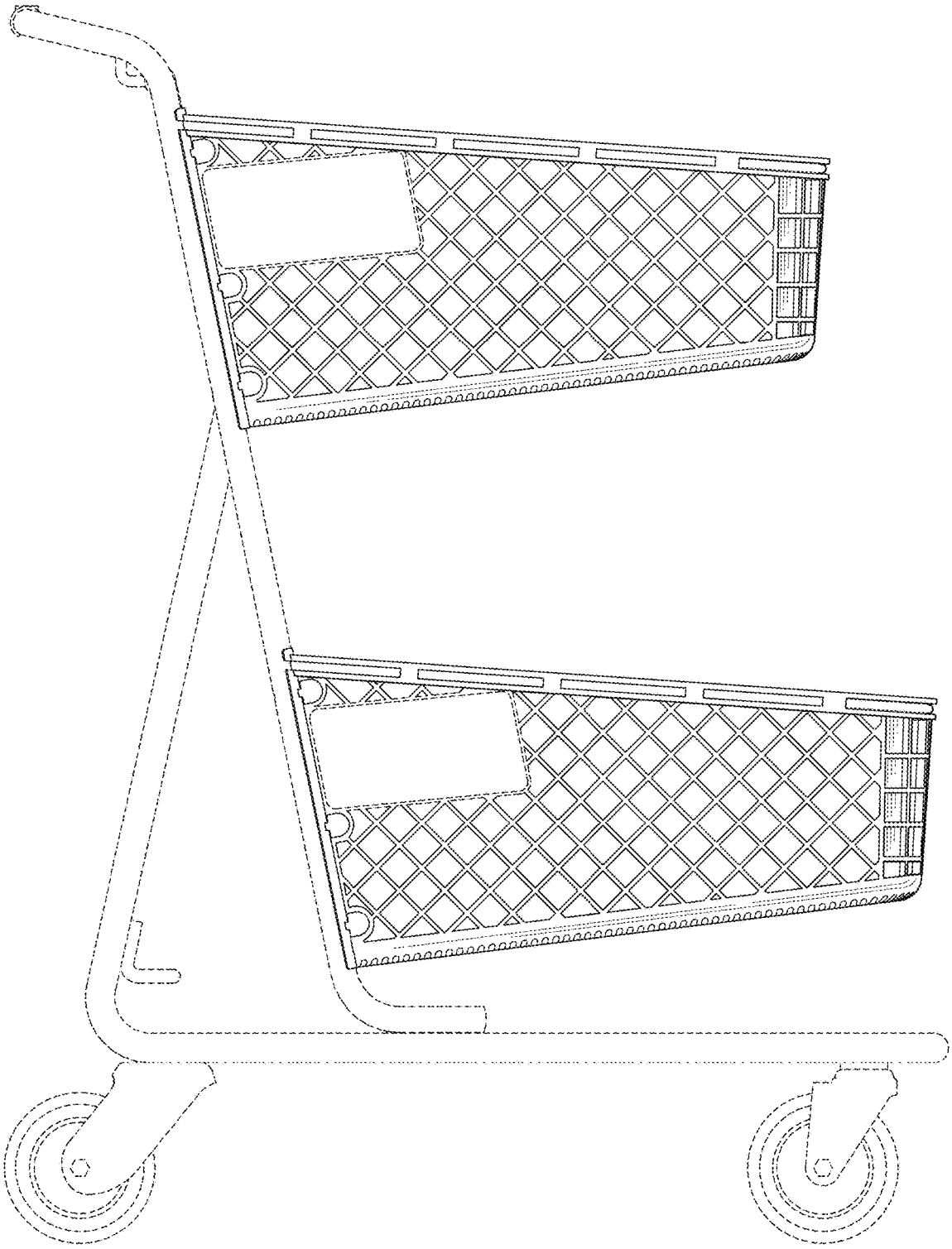
FIG.14 (AMENDED)

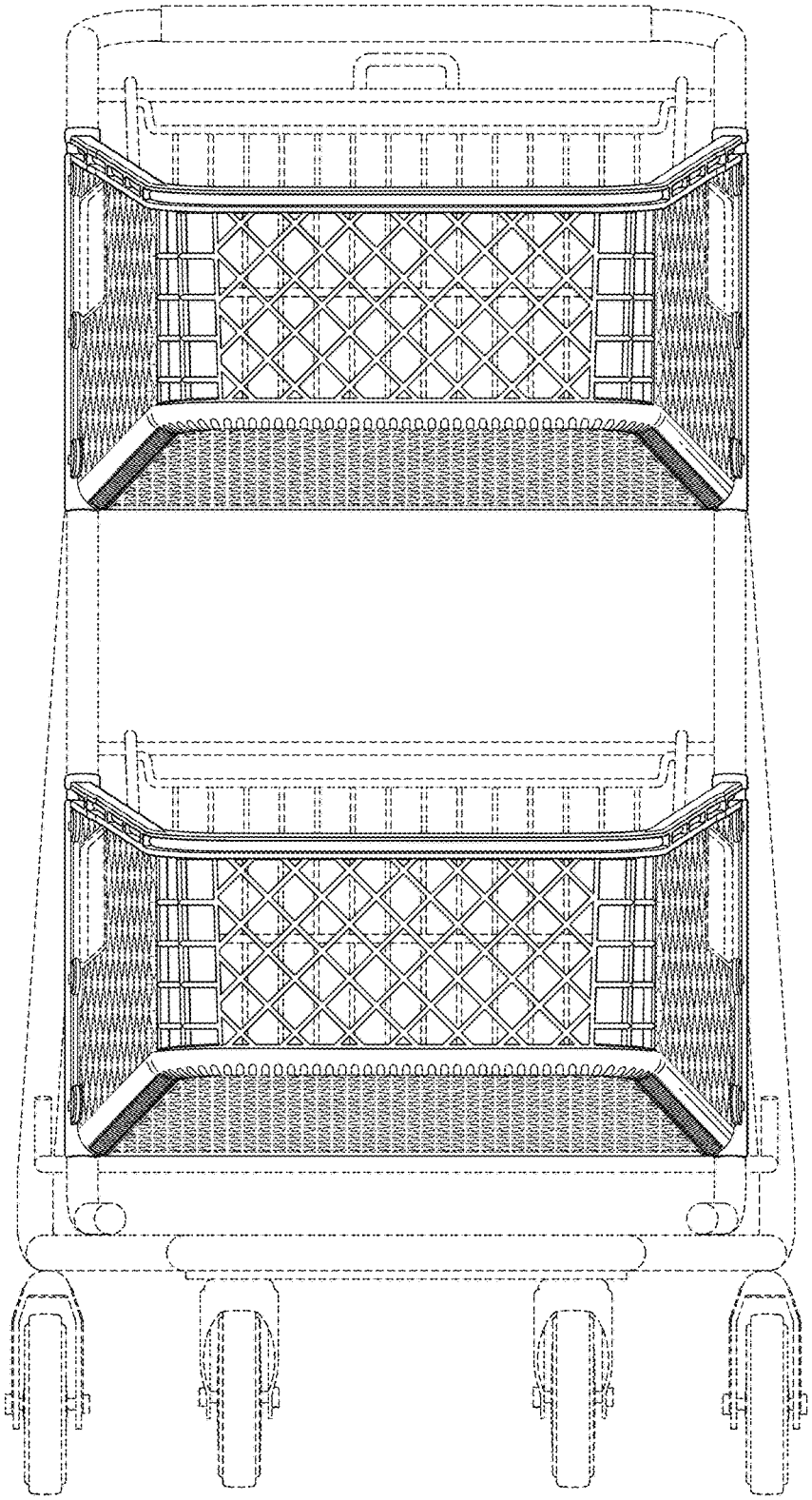
FIG.15 (AMENDED)

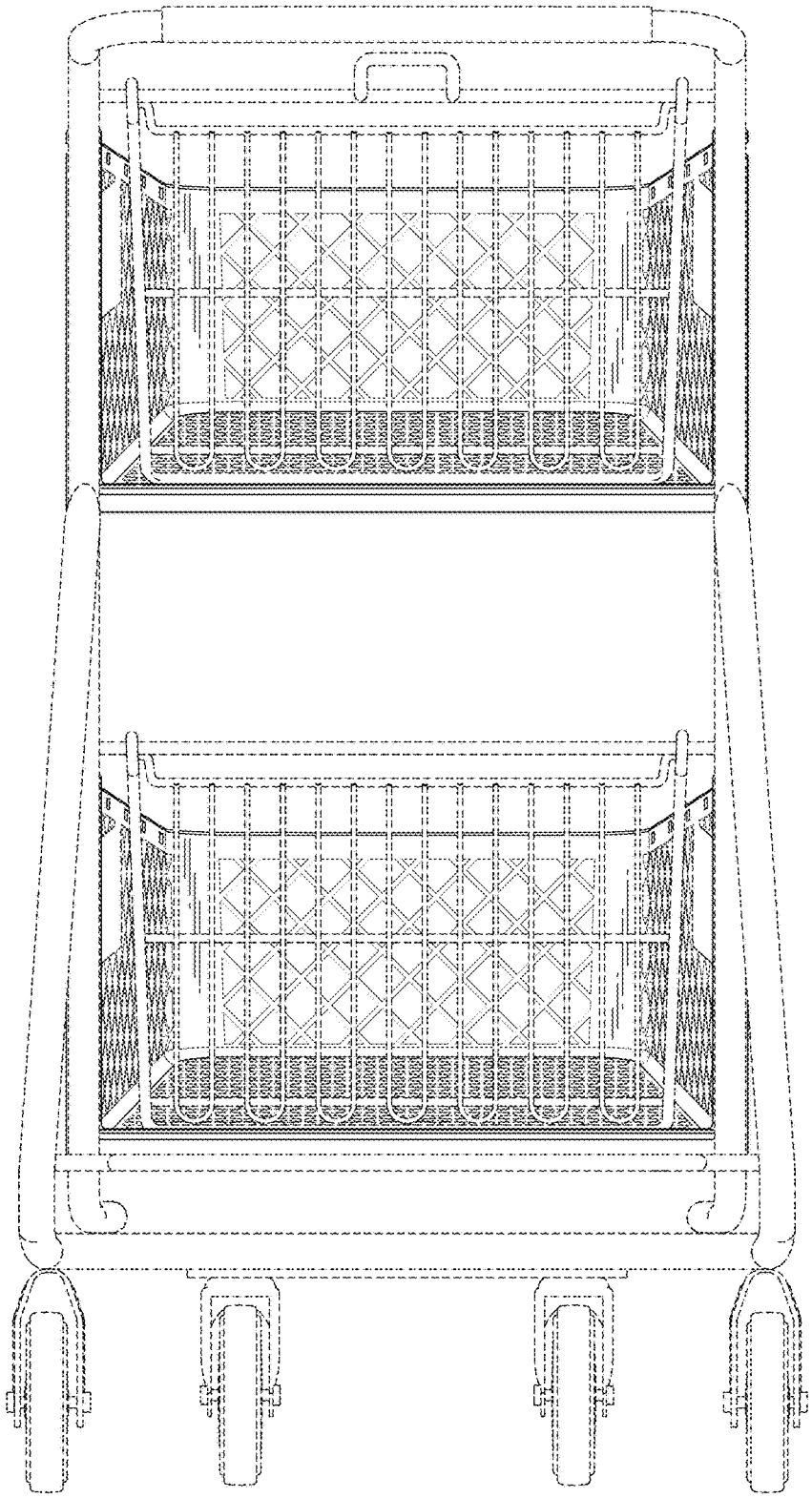
FIG.16 (AMENDED)

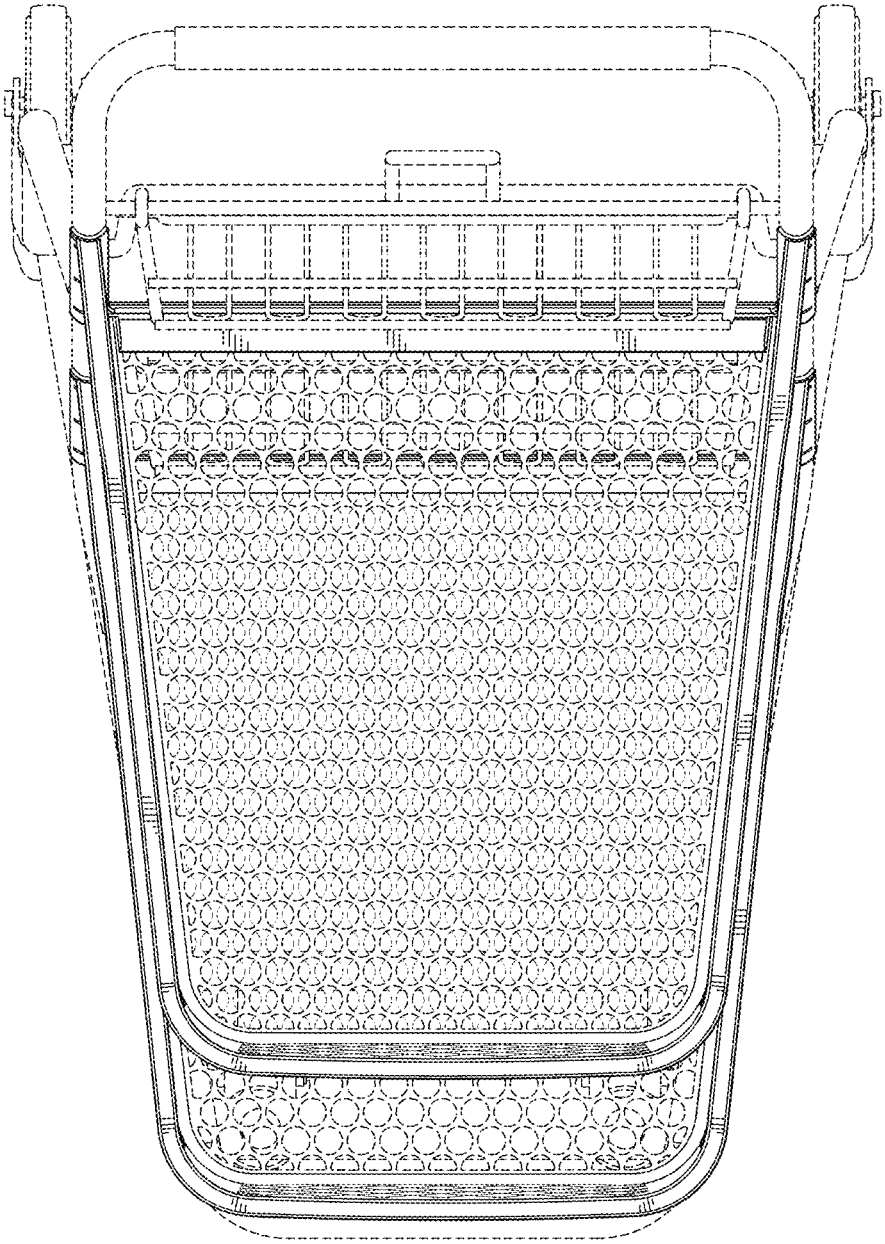
FIG.17 (AMENDED)

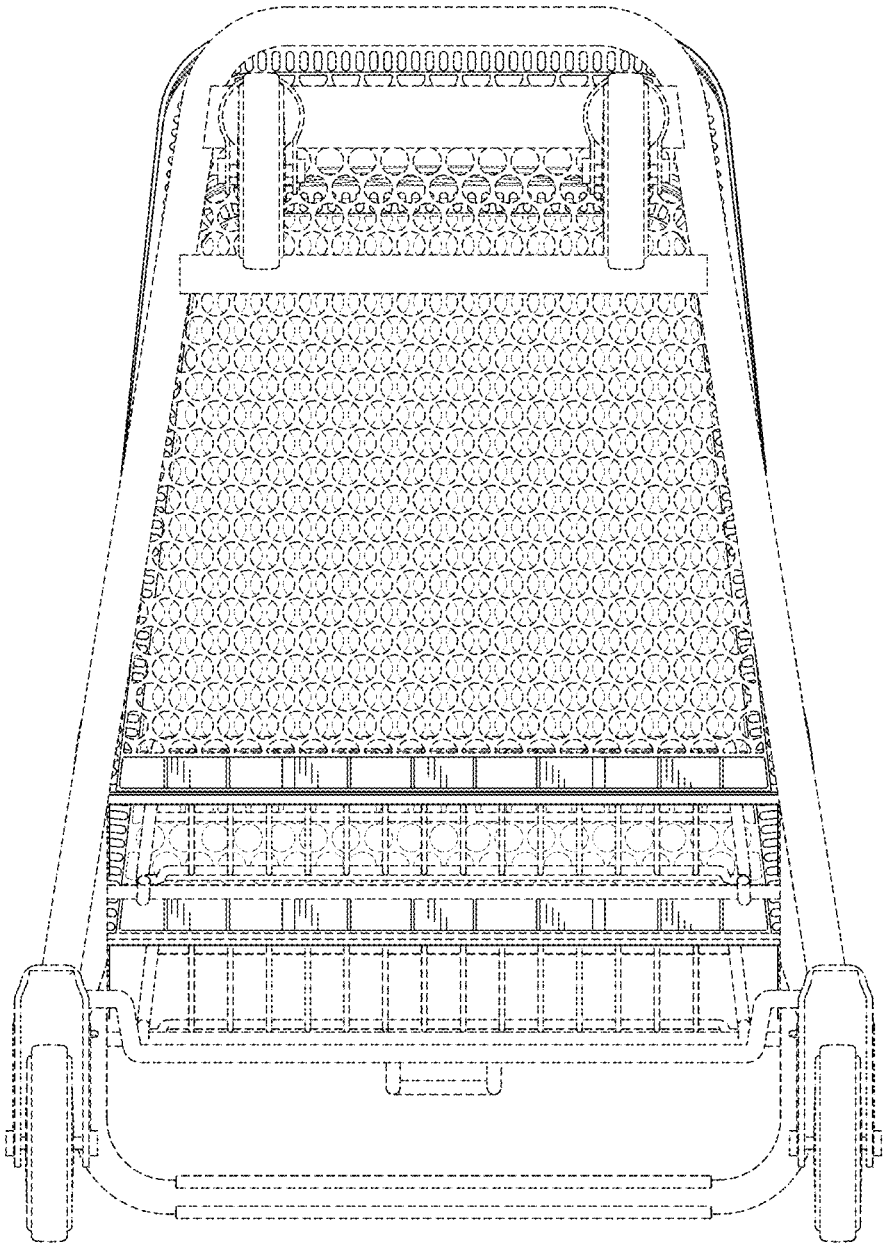
FIG.18 (AMENDED)